United States Patent [19]

Nakakubo et al.

[11] Patent Number: 5,167,402
[45] Date of Patent: Dec. 1, 1992

[54] HYDRAULIC PRESSURE APPARATUS WITH AIR SCAVENGING

[75] Inventors: Katsuya Nakakubo, Tokorozawa; Norio Harada, Iruma; Nobuto Kozakura, Hanno, all of Japan

[73] Assignee: Tsubakimoto Chain Co., Osaka, Japan

[21] Appl. No.: 830,138

[22] Filed: Jan. 31, 1992

[30] Foreign Application Priority Data

Jan. 31, 1991 [JP] Japan .............................. 3-008492[U]

[51] Int. Cl.$^5$ .............................................. B25B 1/06
[52] U.S. Cl. ...................................... 267/226; 188/316; 188/322.22; 474/110
[58] Field of Search ................... 188/316, 352, 322.22, 188/298, 322.15; 474/110, 103, 101, 138, 135, 91; 267/226, 34, 217, 221; 16/51, 52, 197, 72, 82

[56] References Cited

U.S. PATENT DOCUMENTS

| | | | |
|---|---|---|---|
| 2,752,149 | 6/1956 | Forcellini | 188/316 X |
| 4,708,696 | 11/1987 | Kimura et al. | |
| 4,796,732 | 1/1989 | Kong | 267/226 X |
| 4,828,080 | 5/1989 | Locher | 267/226 X |
| 4,909,777 | 3/1990 | Inoue et al. | |
| 4,911,679 | 3/1990 | Inoue et al. | |
| 4,928,799 | 5/1990 | Zschiesche | 267/221 X |
| 4,950,209 | 8/1990 | Kawashima et al. | |
| 5,087,225 | 2/1992 | Futami et al. | |

Primary Examiner—Douglas C. Butler
Attorney, Agent, or Firm—Howson & Howson

[57] ABSTRACT

In a hydraulic tensioner, shock absorber or lash adjuster having a plunger in a cylinder filled with hydraulic fluid, and having a coiled compression spring acting on the plunger in a pressure chamber on one side of the plunger, air scavenging through the restricted space between the plunger and the cylinder wall is improved by providing radial grooves either on a face of the plunger contacted by the spring, or on the spring-contacting face of a plug which is located between the spring and the plunger. The radial grooves enable air to escape from the interior of the coil spring and move toward the cylinder wall. The grooves increase in depth proceeding from the interior of the spring toward the exterior thereof.

2 Claims, 6 Drawing Sheets

F I G. 4
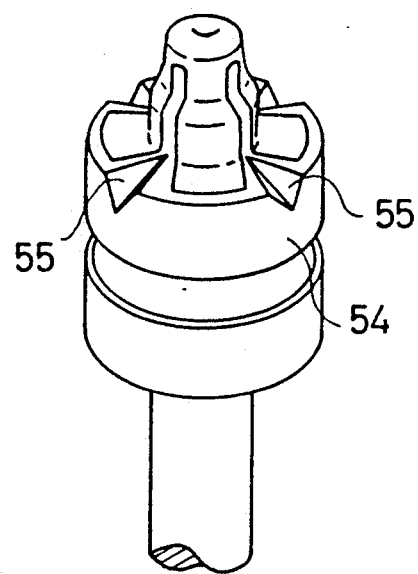

HYDRAULIC PRESSURE APPARATUS WITH AIR SCAVENGING

BRIEF SUMMARY OF THE INVENTION

This invention relates to hydraulic pressure devices, for example hydraulic chain tensioners, shock absorbers and the like, and more particularly to improvements therein which prevent the accumulation of air within the pressure chambers of the devices. Various mechanisms utilize the incompressibility and viscosity of hydraulic fluids to impart desirable characteristics to movable mechanical parts. Examples of such mechanisms include shock absorbers, lash adjusters, and hydraulic tensioners for chains such as camshaft drive chains in internal combustion engines.

A typical hydraulic tensioner comprises a cylinder having a cylindrical interior wall defining an inside space. The space is closed at one end and has a plunger slidable within it for partitioning the inside space into a variable volume pressure chamber located between the plunger and the closed end and an unpressurized chamber located on the opposite side of the plunger. One side of the plunger faces toward the closed end of cylinder. A helical spring, disposed within the pressure chamber in compression between the plunger and the closed end of the cylinder, urges the plunger away from the closed end to increase the volume of the pressure chamber. A restricted passage for the flow of hydraulic fluid, is provided between the periphery of the plunger and the interior wall of the cylinder to allow for restricted flow of fluid from the pressure chamber toward the unpressurized chamber as the plunger moves in the retracting direction, i.e. the direction in which the volume of the pressure chamber decreases. A comparatively unrestricted passage is provided in the plunger for flow of fluid into the pressure chamber when the plunger moves in the extending direction. A check valve, provided in the comparatively unrestricted passage, opens when the plunger moves in the extending direction, but closes when the plunger moves in the retracting direction. Thus, the plunger can move freely and rapidly in the extending direction, but its rate of movement in the retracting direction is limited by the rate at which the hydraulic fluid can flow through the restricted passage between the periphery of the plunger and the interior wall of the cylinder. An external force applied to the plunger and urging it in the retracting direction is resisted both by the compression spring and by the viscous flow of the hydraulic fluid through the restricted passage.

The performance of a conventional hydraulic tensioner deteriorates if, by reason of leakage or some other cause, air enters its pressure chamber. Since air is a compressible fluid, if it is present in the pressure chamber, even in a small quantity, any external force, in excess of the spring force, tending to push the plunger in the retracting direction is no longer effectively resisted by the viscous flow of hydraulic fluid through the restricted passage. Thus, it is possible for an external force to cause vibration of the plunger.

To avoid this problem, it has been considered necessary to take elaborate precautions against the entry of air into the pressure chamber of hydraulic pressure devices, and, in some instances to attempt to scavenge air from the pressure chamber. However, in the typical device, the abutment of the compression spring against the face of the plunger inhibits the flow of air bubbles toward the restricted passage. Thus, it is difficult to scavenge air through the restricted passage in a typical hydraulic pressure device.

The principal object of this invention is to provide for improved scavenging of air from the pressure chamber in a hydraulic pressure device so that the device can continue to function properly over an extended period of time. Further objects of the invention are to provide for effective scavenging of air from the pressure chamber in a short time following its entry, to eliminate abnormal vibration, and, by virtue of the reduction of vibration, to reduce frictional contact between relatively moving parts of the device.

In accordance with the invention, at least one groove is provided which extends in the radial direction on the side of plunger facing toward the closed end of the cylinder, for conducting air past the spring, so that air accumulated in the pressure chamber can be readily scavenged between the interior wall of the cylinder and the plunger. In a preferred embodiment of the invention, the radially extending groove is provided on a plug located within the pressure chamber between the compression spring and a surface of the plunger facing the closed end of the cylinder.

Whereas, in prior art devices, it was difficult to scavenge air from the pressure chamber because of the spring, the radial groove in accordance with the invention extends from the inside of the spring to the outside, and constitutes part of the scavenging path for air remaining adjacent to the face of the plunger within the interior of the coil spring. Because the scavenging path provides for outward flow of air past the spring, the air is readily scavenged between the cylinder wall and the plunger.

Further objects, advantages and details of the invention will be apparent from the following detailed description when read in conjunction with the drawings.

BRIEF DESCRIPTION OF THE DRAWINGS

FIG. 4 is a perspective view of a plunger in accordance with a second embodiment of the invention, in which the air scavenging grooves are formed in an end face of the plunger, thereby eliminating the need for a separate plug;

DETAILED DESCRIPTION

Figure 9:
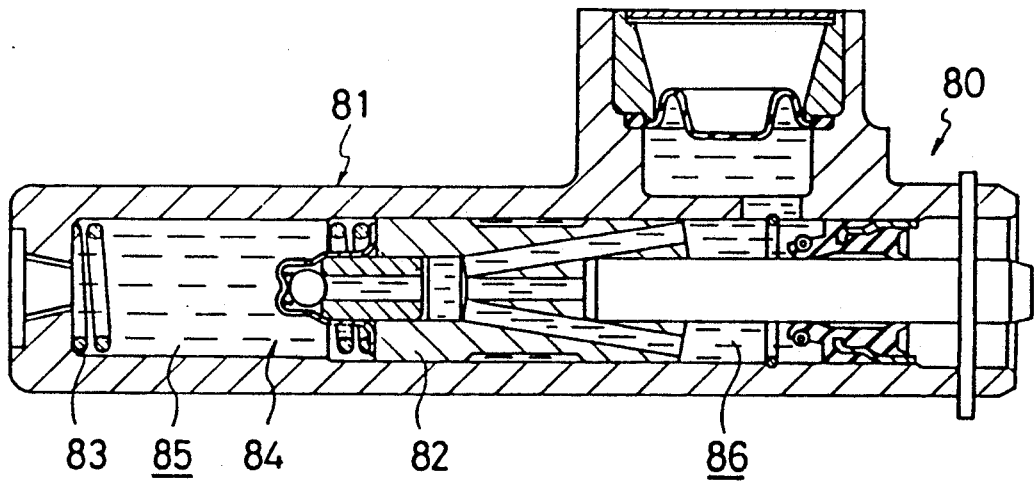
FIG. 9 is an axial section showing a conventional tensioner in accordance with the prior art.

Referring first to FIG. 9, which shows a conventional tensioner 80 of the type used to maintain tension in the camshaft drive chain of an internal combustion engine, the tensioner comprises a cylinder 81, a plunger 82 and a coil spring 83, located in a pressure chamber 85, and held in compression between plunger 82 and a closed end of the chamber. The pressure chamber 85, and an unpressurized chamber 86 on the opposite side of the plunger, are filled with a hydraulic fluid. A check valve 84, carried on the plunger, permits hydraulic fluid to flow freely from chamber 86 to chamber 85 through a passage in the plunger as the plunger moves in the extending direction, but prevents flow through the passage when the plunger is moving in the retracting direction.

Air within pressure chamber 85, even if only in a small quantity, can cause deterioration of the performance of the tensioner. To some extent, the air is scavenged between the plunger and the interior wall of the cylinder. However, because the loop at the end of coil spring 83 abuts the plunger, it is difficult to scavenge air located adjacent the face of the plunger within the loop at the end of the spring.

Figure 1:
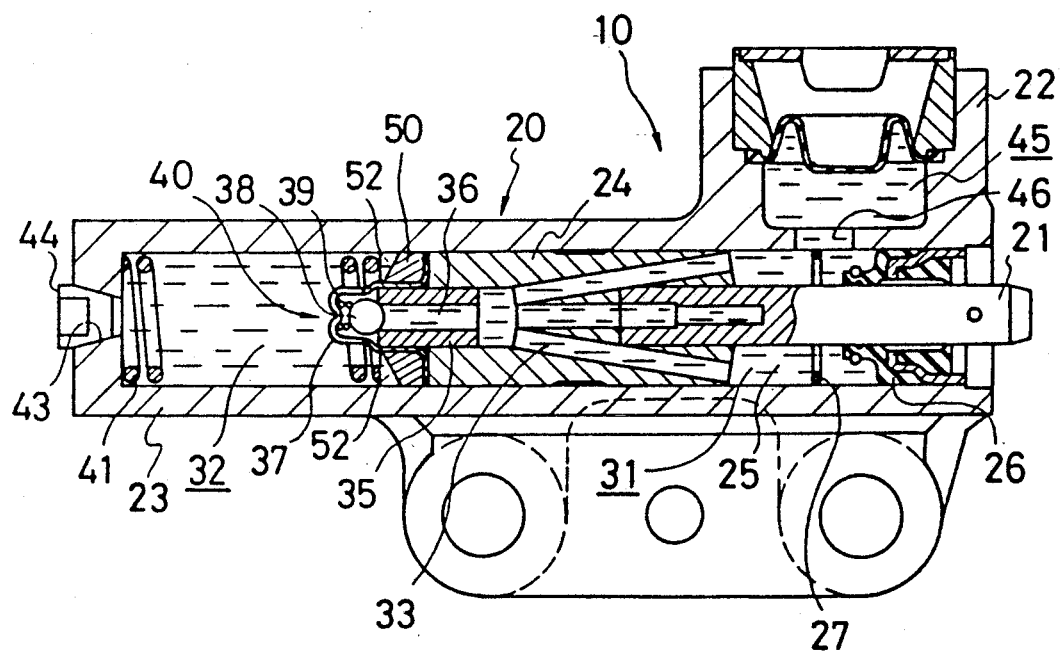
FIG. 1 is an axial section of a tensioner utilizing a grooved air scavenging plug in accordance with the invention.

In the improved tensioner 10, shown in FIG. 1, cylinder 20 is provided with a hydraulic fluid reservoir 22 located at one end of the main body of the cylinder. Plunger 24 is slidable in cylinder 20, and a small clearance is provided between the plunger and the interior wall of the cylinder to allow for restricted flow of hydraulic fluid from pressure chamber 32, on one side of the plunger, to unpressurized chamber 31 on the opposite side of the plunger. A piston rod 21 is press fit into plunger 24 and extends outwardly through the end of the cylinder at which the reservoir is located. A seal 26 prevents leakage of hydraulic fluid 25 from chamber 31. Ring 27, in chamber 31, serves as a stop for the plunger.

A passage 33 is provided in the plunger for flow of oil from unpressurized chamber 31 to pressure chamber 32. A valve seat 35 is provided on the side of plunger 24 which faces toward pressure chamber 32. Valve seat 35 has a longitudinal hole 36 which communicates with passage 33. Check valve 40 cooperates with seat 35 to allow free flow of hydraulic fluid from the unpressurized chamber 31 to pressure chamber 32 through passage 33 and hole 36, while preventing flow through the same path in the opposite direction. The check valve includes a ball 38, a retainer 37, and a weak spring 39 which urges ball 38 against the opening of longitudinal hole 36.

The end of the main body of cylinder 20 opposite the end at which the reservoir is located, is closed and is provided with a hole 43 for charging the cylinder with hydraulic fluid. This hole is closed by a bull plug 44.

Because of the presence of piston rod 21, the total volume of chambers 31 and 32 changes as plunger 24 moves. The interior chamber 45 of reservoir 22 is in communication with chamber 31 and holds a quantity of hydraulic fluid which accommodates changes in the total volume of chambers 31 and 32.

A ring-shaped plug 50 is disposed against the face of plunger 24 on the pressure chamber side of the plunger. This plug surrounds the portion of valve seat 35 which protrudes from the plunger. Compression spring 41, one end of which is in engagement with the closed end of the cylinder, presses ring 50 against plunger 24, and therefore applies a force to the plunger urging it in the extending direction.

Figure 2:
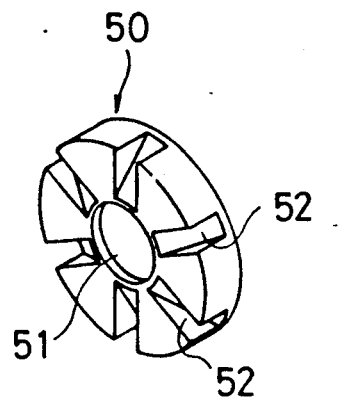
FIG. 2 is a perspective view showing the air scavenging plug of FIG. 1.
Figure 3:
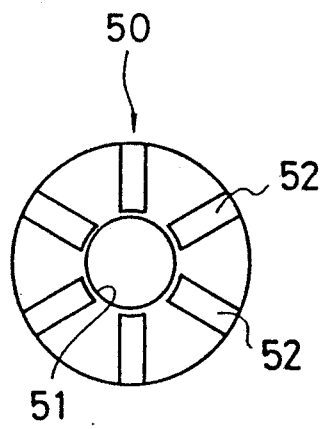
FIG. 3 is an end elevation of the plug of FIG. 2.

As shown in FIGS. 2 and 3, plug 50 has a central hole 51. This hole, as shown in FIG. 1, receives the protruding portion of seat 35 of check valve 40 as well as a portion of retainer 37 which surrounds seat 35. The radius of hole 51 is smaller than the inner radius of compression spring 41, and the outer radius of plug 51 is larger than the outer radius of spring 41.

Referring again to FIGS. 2 and 3, plug 50 is provided with a plurality of grooves 52 which extend radially to the outer periphery of the plug from an imaginary circle near central hole 51. These grooves are uniformly spaced, and, as shown in FIGS. 1 and 2, they are inclined so that, approaching the outer periphery of the plug, the depth of each groove increases.

As shown in FIG. 1, the loop at one end of spring 41 engages plug 52 and spans the radial grooves. Therefore, the grooves provide paths for the radial outward flow of air, and hydraulic fluid as well, past the loop of the spring from the interior of the spring to the exterior thereof.

The outer radius of plug 50 is slightly less than the radius of the cylindrical interior wall of cylinder 20, and the inner radius of hole 51 in the plug is slightly larger than the outer radius of retainer 37. Since plug 50 is held against plunger 24 by the force exerted by spring 41, it is not necessary to provide a fastener to fix plug 50 to plunger 24.

Because the outer radius of plug 50 is less than the radius of the interior wall of cylinder 20, and grooves 52 are inclined, the resistance to flow between cylinder 20 and plug 50 is minimal at the deepest portions of the radial grooves 52. Consequently, the flow of hydraulic fluid from pressure chamber 32 to unpressurized chamber 31 takes place chiefly through grooves 52. This flow effectively scavenges air which would otherwise be trapped inside the compression spring.

In the alternative embodiment depicted in FIG. 4, radial grooves 55 are provided on the plunger 54 itself, rather than on a separate plug as in FIGS. 1-3. The grooves, as shown in FIG. 4, are four in number, and symmetrically disposed on the pressure side of the plunger between the feet of the check valve ball retainer. These grooves increase in depth toward the periphery of the plunger. They have a V-shaped cross section. However, they can be formed with rectangular cross sections as in FIGS. 2 and 3, or in other shapes.

Figure 5:
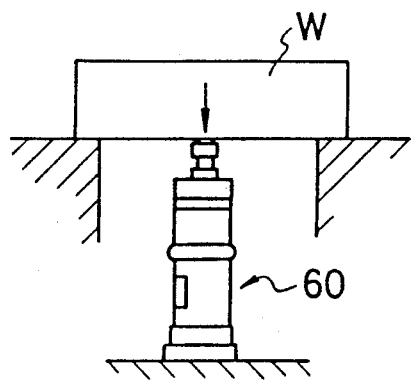
FIG. 5 is an elevation, partly in section, showing a shock absorber utilizing an air scavenging feature in accordance with the invention.
Figure 6:
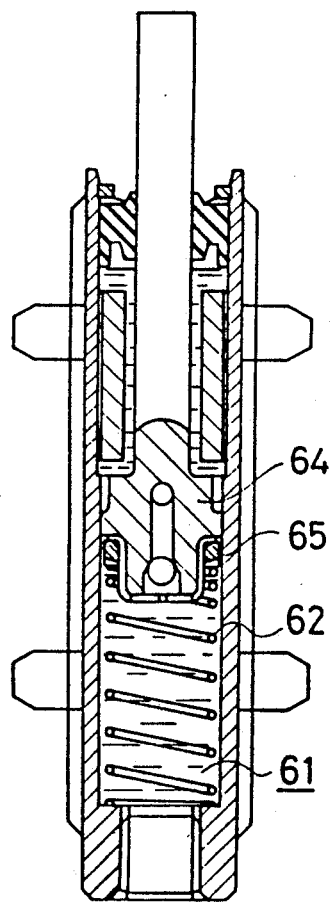
FIG. 6 is an axial section showing the significant interior parts of the shock absorber of FIG. 5.

Shock absorber 60, shown in FIGS. 5 and 6, is used to cushion a heavy object W. Unlike the tensioner described above, the shock absorber is not used to apply a protruding force, but rather is used to absorb kinetic energy by the viscous flow of hydraulic fluid through a restricted passage when a load is applied.

If air is present in the pressure chamber of the shock absorber, the damping effect of the device is nullified. Therefore, as in the case of the tensioner of FIG. 1, a plug 65, having radial grooves, is provided in pressure chamber 61 between the pressure chamber side of plunger 64 and a compression spring 62. Plug 65 can be identical to plug 50 shown in FIGS. 2 and 3. Alternatively, plug 65 can be eliminated, and the radial grooves can be formed directly on the face of the plunger.

Figure 7:
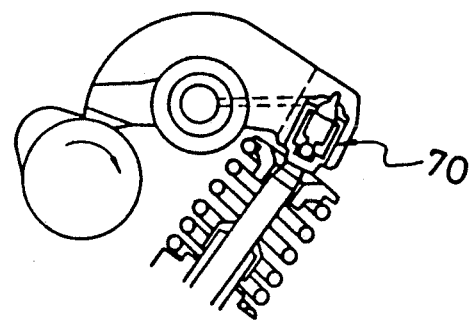
FIG. 7 is a fragmentary elevational view showing a lash adjuster in accordance with the invention utilized in a rocker arm of an internal combustion engine.

In FIG. 7, a lash adjuster 70, mounted in a cam-driven rocker arm of an internal combustion engine, is provided for engagement with the stem of a valve. The lash adjuster is provided to adjust the clearance between the valve and the valve seat in the cylinder head of the engine so that the valve can close fully, yet open widely enough to achieve optimum engine performance.

Figure 8:
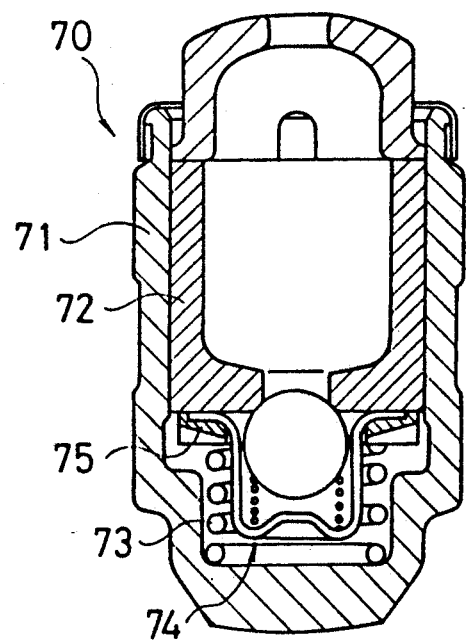
FIG. 8 is an axial section showing the internal details of the lash adjuster of FIG. 7.

In the lash adjuster, as shown in detail in FIG. 8, cylinder 71 is provided with a plunger 72 slidable therein and urged by compression spring 73 in a direction to expand the adjuster axially. A check valve 74 on the plunger allows free flow of oil into the interior chamber of the adjuster between the plunger and the closed end of cylinder 71, but prevents flow in the opposite direction so that flow of oil must take place through the restricted space between the plunger and the interior wall of the cylinder. A plug 75, which can be substantially similar to plug 50 in FIGS. 2 and 3, is disposed between the pressure side of plunger 72 and spring 73. The pressure chamber below the piston is filled with oil, which is delivered from the camshaft through a passage in the rocker arm and then through the interior of plunger 72. The adjuster tends to expand under the action of spring 73 when the rocker is off its cam lobe, so that the cylinder is maintained close to, or in contact with, the valve stem. The pressure applied to the valve stem by the adjuster, however, is not enough to overcome the force of the valve spring and move the valve away from its seat. Then, when the rocker is moved (clockwise in FIG. 7) by the camshaft, the valve is able to open the valve fully since the restricted flow of oil out of the pressure chamber retards the axial compression of the adjuster.

Any air which accumulates in the adjuster, inside the portion of the spring which is in contact with the plunger, tends to flow, along with oil, outwardly past the spring through the radial grooves of the plug to a location adjacent to the cylinder wall, from which it can be scavenged between the plunger and the cylinder wall. In this way, air is effectively scavenged from the pressure chamber of the adjuster, so that it can operate effectively over a long period of time.

As will be apparent from the foregoing, the use of radial grooves, whether in a separate plug, or formed in the plunger itself, provides for more effective scavenging of air than was heretofore possible. This enables the hydraulic pressure device to operate effectively over a longer period of time. It eliminates vibration, excessive friction and other malfunctions in tensioners, and prevents deterioration of the performance of shock absorbers, lash adjusters and similar hydraulic pressure devices.

Various modifications can be made to the apparatus described above. For example, while the radial grooves are preferably provided in a symmetrical arrangement in which there is at least one groove in each quadrant, other numbers, arrangements and configurations of grooves can be used to permit air in the pressure chamber to move past the compression spring. While the invention has been described in the context of hydraulic tensioners, shock absorbers and lash adjusters, it may find application in other hydraulic pressure devices in which air scavenging is impeded. Various other modifications and applications, which will occur to those skilled in the art are within the scope of the invention as defined in the following claims.

We claim:

1. A hydraulic pressure apparatus comprising:

means providing a cylinder having a cylindrical interior wall defining an inside space, and means for closing said inside space at one end thereof;

means providing a plunger slidable in said cylinder for partitioning said inside space into a variable volume pressure chamber located between said plunger and said one end and an unpressurized chamber located on the opposite side of said plunger, said plunger having a surface facing toward said one end of said inside space;

means providing a compression spring disposed in said pressure chamber and urging said plunger in the direction away from said one end to increase the volume of said pressure chamber; and means providing a restricted passage for the flow of hydraulic fluid, between the periphery of said plunger and the interior wall of said cylinder, from said pressure chamber toward said unpressurized chamber;

wherein the improvement comprises a plug located within said pressure chamber between said compression spring and said surface of the plunger, said plug having means comprising at least one groove extending in the radial direction for conducting air past said spring, whereby air accumulated in said pressure chamber can be readily scavenged between said interior wall of the cylinder and said plunger.

2. A hydraulic pressure apparatus comprising: means providing a cylinder having a cylindrical interior wall defining an inside space, and means for closing said inside space at one end thereof;

means providing a plunger slidable in said cylinder for partitioning said inside space into a variable volume pressure chamber located between said plunger and said one end and an unpressurized chamber located on the opposite side of said plunger, said plunger having a side facing toward said one end of said inside space;

means providing a compression spring disposed in said pressure chamber and urging said plunger in the direction away from said one end to increase the volume of said pressure chamber; and means providing a restricted passage for the flow of hydraulic fluid, between the periphery of said plunger and the interior wall of said cylinder, from said pressure chamber toward said unpressurized chamber;

wherein the improvement comprises means providing at least one groove, extending in the radial direction and located on the side of plunger facing toward said one end of the inside space of the cylinder, for conducting air past said spring, whereby air accumulated in said pressure chamber can be readily scavenged between said interior wall of the cylinder and said plunger.

* * * * *